United States Patent [19]
Kurahashi

[11] Patent Number: 5,740,447
[45] Date of Patent: Apr. 14, 1998

[54] BRANCH INSTRUCTION OPTIMIZING PROCESS SYSTEM IN LINKAGE EDITOR

[75] Inventor: Keiichi Kurahashi, Tokyo, Japan

[73] Assignee: NEC Corporation, Tokyo, Japan

[21] Appl. No.: 611,493

[22] Filed: Mar. 5, 1996

[30] Foreign Application Priority Data

Mar. 5, 1995 [JP] Japan .................................. 7-072345

[51] Int. Cl.$^6$ ....................................................... G06F 9/45
[52] U.S. Cl. ........................... 395/709; 395/710; 395/685
[58] Field of Search ................................... 395/709, 710, 395/685

[56] References Cited

U.S. PATENT DOCUMENTS

| 4,567,574 | 1/1986 | Saade et al. | 395/709 |
| 4,763,255 | 8/1988 | Hopkins et al. | 395/709 |

FOREIGN PATENT DOCUMENTS

| 62-205431 | 9/1987 | Japan . |
| 6-51993 | 2/1994 | Japan . |

Primary Examiner—Krisna Lim
Assistant Examiner—Patrice L. Winder
Attorney, Agent, or Firm—Foley & Lardner

[57] ABSTRACT

A branch instruction optimizing process system which performs optimization of code length of branch instruction for branching between modules includes a locating portion for locating a plurality of segments forming object modules within address space, and optimization processing portion for performing optimization of branch instruction per segment on the basis of a re-location information. The optimization processing portion includes instruction judging portion for making judgement of branch instruction, code variation amount calculating portion for calculating the code variation amount between the branch instruction and a jumping label, distance calculating portion for calculating a distance between the branch instruction and the label, instruction determining portion for determining modification of the code length of branch instruction, address correction portion for correcting address depending upon variation of the code length of the determined branch instruction, segment correction portion for correcting the segment size depending upon variation of the code length of the branch instruction, and the locating portion re-locating all segments in the address space every time the optimization process of branch instruction with respect to one segment by the optimization means.

13 Claims, 6 Drawing Sheets

| MODULE SIZE | | k1 | |
|---|---|---|---|
| | LABEL | RELATIVE ADDRESS FROM LEADING END | RELATIVE ADDRESS FROM TERMINATING END |
| BRANCH INSTRUCTION | B | n1 | m1 |
| | C | n2 | m2 |
| BRANCHING DESTINATION | A | n3 | m3 |

22

| MODULE SIZE | | k2 | |
|---|---|---|---|
| | LABEL | RELATIVE ADDRESS FROM LEADING END | RELATIVE ADDRESS FROM TERMINATING END |
| BRANCH INSTRUCTION | B | n4 | m4 |

23

| MODULE SIZE | | k3 | |
|---|---|---|---|
| | LABEL | RELATIVE ADDRESS FROM LEADING END | RELATIVE ADDRESS FROM TERMINATING END |
| BRANCH INSTRUCTION | B | n5 | m5 |
| BRANCHING DESTINATION | C | n6 | m6 |
| BRANCH INSTRUCTION | B | n7 | m7 |

BRANCH INSTRUCTION OPTIMIZING PROCESS SYSTEM IN LINKAGE EDITOR

BACKGROUND OF THE INVENTION

1. Field of the Invention

The present invention relates to a branch instruction processing system for arranging module by a linkage editor (linker) for an information processing system. More specifically, the invention relates to a branch instruction processing system for performing optimization of a code length of a branch instruction between modules.

2. Description of the Related Art

In a processing system for a branch instruction upon assembling a program written in assembly language by means of assembler, an optimal code length of branch instruction is selected by assembler within a range of addresses in a module of a problem as an assemble unit on the basis of a distance of addresses of the branch instruction and a label, to which the branch instruction makes reference.

On the other hand, the modules are linked only by a linker after assembling. A branch from one module to the other module does not have information for making judgement for the branch instruction of optimal code length for branching. Therefore, the branch instruction which can branch up to the most distant address, namely the branch instruction having the longest code length is selected at discretion.

Japanese Unexamined Patent Publication (Kokai) No. Showa 62-205431 proposes a linker for solving the drawback set forth above. In order to optimize the code length of the branch instruction between modules, the disclosed linker is provided with means for holding module size, means for holding relative address from a leading address of the module, in which the branch instruction of the branch instruction between modules is involved, means for holding a label which is made reference to by the branch instruction between modules, and means for holding a relative address from the end of the module the label which is made reference to from the module other than the module, in which the label is belonged. With such construction, the linker selects the branch instruction having possible shortest code length as long as branching by the branch instruction having the short code length is possible, with respect to all branch instructions.

Figure 6:
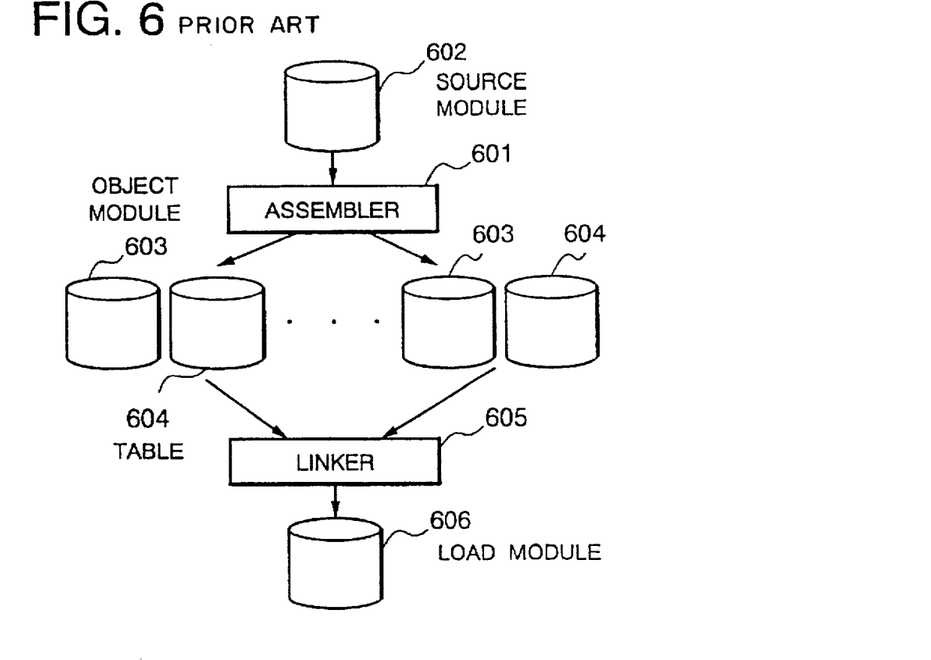
FIG. 6 is a block diagram showing a construction of the conventional linker.

This technology will be discussed more concretely. FIG. 6 is a block diagram showing the conventional branch processing system. As shown in FIG. 6, an assembler 601 as a compiler program generates a table 604 of object modules upon assembling. A linker 605 as linkage editor. The linker 605 selects optimal branch instruction with reference to the table 604 and embeds in the generated load module 606.

Figure 7:
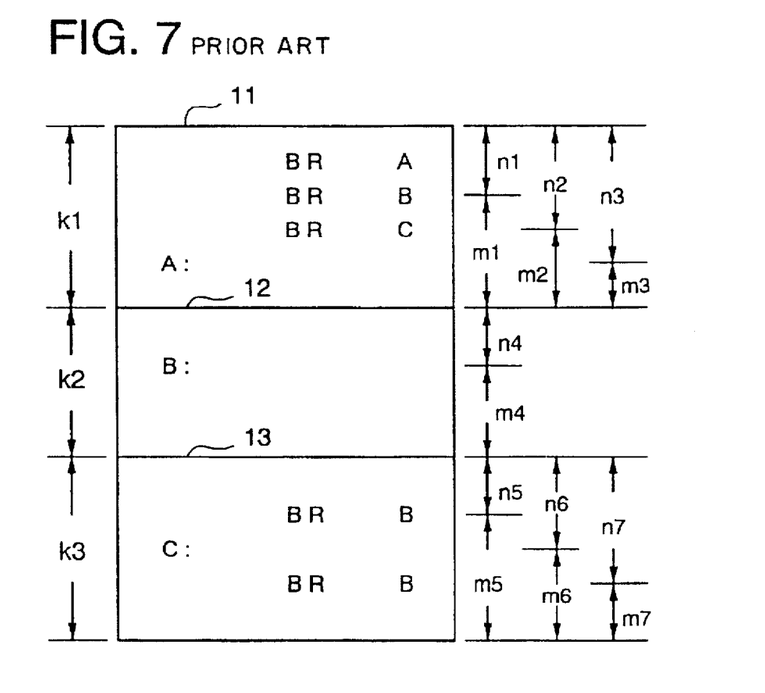
FIG. 7 is an explanatory illustration showing one example of a user program.

This process will be discussed with reference to an explanatory illustration showing one example of a user program of FIG. 7 and an illustration showing a table structure of FIG. 8. When modules 11, 12 and 13 are linked in order, the linker calculates a sum (m1+n4) of a relative address m1 of the first branch instruction BR B from the terminating end of the module with reference to a table 21 and a relative address n4 of the a branching destination B from the leading end of the module by making reference to a table 22 concerning the branching destination B of the branch instruction BR B, and makes judgement whether the branching destination B is within a range of branching with the branch instruction of short code length or not.

Figure 8:
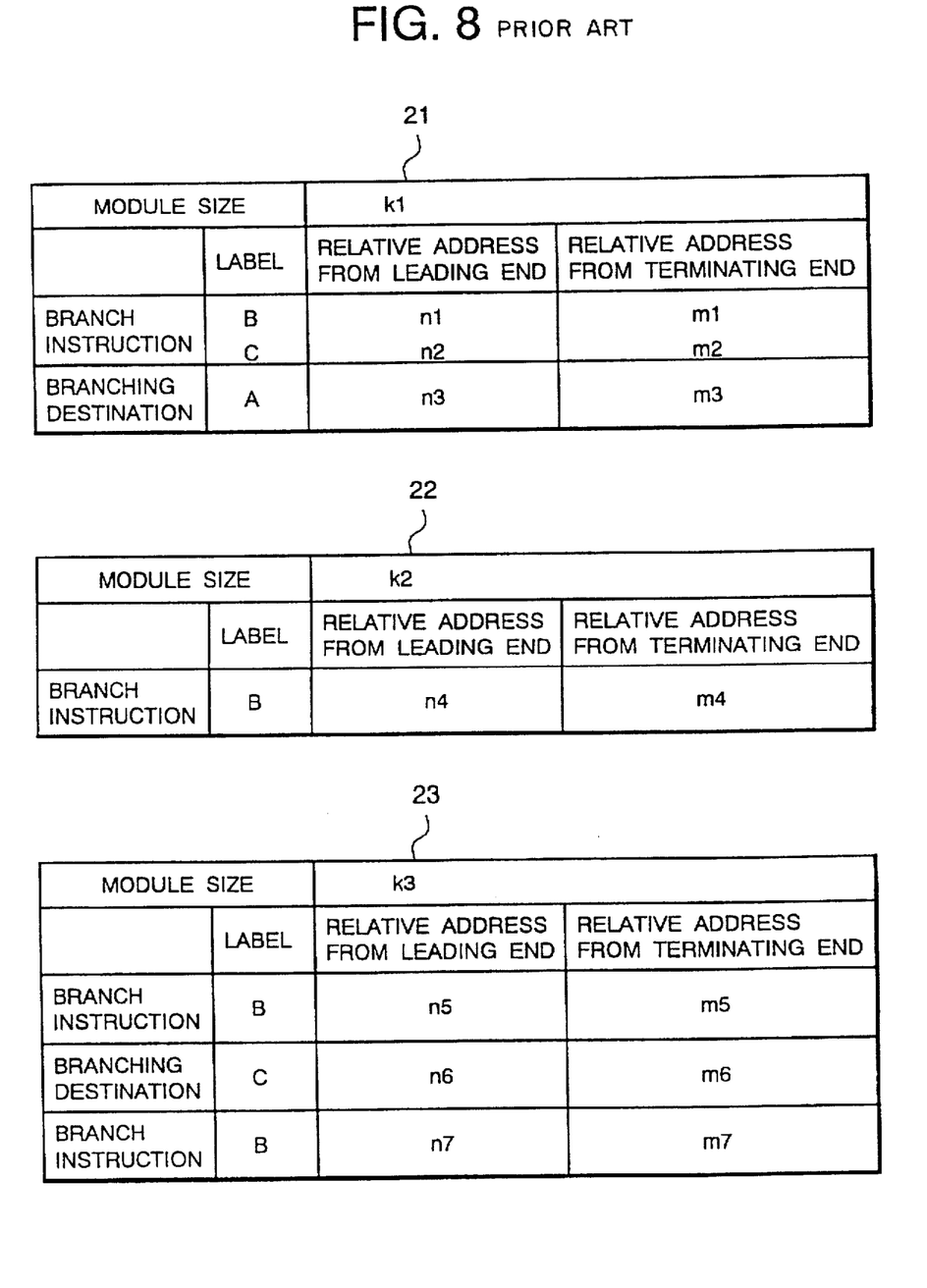
FIG. 8 is an illustration showing a structure of the table to be employed in the conventional linker.

It should be noted that, in table of FIG. 8, a label of "branch instruction" is a label name of the branching destination of the branch instruction, and a label of "branching destination" is a label name assigned for the branching destination.

As a result, if the branching destination is not within the range for branching, a temporary branch instruction BR B is replaced with anther branch instruction with a long branch length. On the other hand, if the braking destination is within the range for branching with the branch instruction of the short code length, the temporary branch instruction is replaced with the branch instruction of short code length. When the temporary branch instruction is replaced with the branch instruction of the short code length, address offset may be caused between an address which make reference to the address following to the address of the shortened branch code and a referred address in the extend corresponding the difference (code length of the long code length branch instruction—code length of the short code length branch instruction). Therefore, correction of content of re-arrange information has to be performed.

When the temporary branch instruction is replaced with the branch instruction of the short code length, correction of the re-arrange information is performed for the difference of (code length of the long code length branch instruction—code length of the short code length branch instruction). Similar calculation, judgement, replacement of the branch instruction and correction of the re-arrange information is performed for each of two branch instructions of a module 13. When replacement of all of the temporary branch instructions is completed, for the portion which makes reference to the address based on the re-arrange information, correction is effected for variation of the code length.

For the branch instruction BR A of the module 11, the address indicative of the branch instruction and a label A. If the branch instructions BR B and BR C are shortened, the address of the label A is also varied. Therefore, after completion of replacement of the branch instruction the address information of the address reference portion is updated on the basis of the re-arrange information.

On the other hand, in case of the linker of FIG. 6, the branch instruction does not take a segment (a unit of a minimum address range for performing re-location. On the other hand, the module is a unit for assembling and consisted of several segments) at a location surrounded by the preferential order of re-location, the branch instruction and the label to be used for the branch instruction. In judgment of the code length of the branch instruction BR B, the code length to which the branch instruction BR C between the branch instruction BR B and the label B may vary is not considered. Therefore, even when the branch instruction BR C is certainly be the branch instruction of short code length, the branch instruction BR B can become the branch instruction of long code length. Thus, selection of the optimal code length cannot be done. Namely, even when the branch instruction BR B will never be the branch instruction of the long code length if the branch instruction BR C becomes the branch instruction of the short code length, the branch instruction BR B is unconditionally varied to the branch instruction of the long code length.

On the other hand, in such case, since the program length in the original segment is varied, a problem will be arisen in consideration of the preferential order of re-location of the segments.

In the conventional branch instruction processing system as set forth above, after arranging the modules by the linker, re-location is performed only once in batch manner in the order of arrangement of the program. Accordingly, when the arrangement of the segment is not ascending order or the branch instruction is described between the branch instruction and the label to which the branch instruction make reference to, optimal code length of the branch instructions cannot be selected to cause increasing of the code length. In particularly, when development of assembler which is strict in ROM restriction, due to difficulty of selection of the optimal code length of the branch instruction, the designer of the program is required some measure in description of the source program file.

SUMMARY OF THE INVENTION

Therefore, it is an object of the present invention to solve the problems set forth above and thus to provide a branch instruction processing system which can optimize the code length of the branch instruction between modules.

Another object of the present invention is to provide a branch instruction processing system in a linkage editor which can make all of the branch instructions between modules in the program to have optimal code lengths by calculating a code variation amount between the branch instruction and the label to which the branch instruction make reference to perform determination of the branch instruction, correction of the address and correction of the segment and repeating re-location at every occasion of determination of the branch instruction and corrections of the address and segment according to the preferential order of arrangement of the segments.

A further object of the present invention is to provide a branch instruction processing system which can make the code lengths of all of the branch instructions between the models optimal, and even when the arrangement of the segments is not the ascending order or a large number of branch instructions are present between the branch instruction and the label, to which the reference os made, the optimal code lengths of the branch instructions can be selected.

According to one aspect of the invention, a branch instruction optimizing process system for performing optimization of code length of branch instruction for branching between modules in locating modules by a linkage editor for an information processing system, comprises:

locating means for locating a plurality of segments forming object modules within address space according to preferential order of location; and optimization processing means for performing optimization of branch instruction per segment on the basis of a re-location information describing code variation information per instruction to be processed via address included in the object module;

the optimization processing means including:
  instruction judging means for making judgement of branch instruction contained in the segment;
  code variation amount calculating means for calculating the code variation amount between the branch instruction and a jumping label;
  distance calculating means for calculating a relative address width between the address of the branch instruction and the jumping destination label;
  instruction determining means for modifying and determining the code length of branch instruction on the basis of the code variation amount and relative address width;
  address correction means for correcting address of instruction following the branch instruction and an address value of the jumping label depending upon variation of the code length of the determined branch instruction;
  segment correction means for correcting the segment size depending upon variation of the code length of the branch instruction; and
  the locating means re-locating all segments of the object module in the address space every time the optimization process of branch instruction with respect to one segment by the optimization means.

The instruction judgement means may perform judgement of branch instruction on the basis of a kind of instruction designated by the re-location information,
  the code variation amount calculating means may calculate a sum of code variation amount included in the re-location information presenting between the branch instruction and the jumping label, and
  the instruction determining means may determine modification of the code length of branch instruction on the basis of a sum of the code variation amount and the relative address width.

In the alternative, the instruction judging means may perform judgement of the branch instruction on the basis of a kind of instruction designated by the re-location information,
  the code variation amount calculating means may calculate a sum of code variation amount included in the re-location information presenting between the branch instruction and the jumping destination label, and
  the instruction determining means may make judgement whether a sum of a total of the code variation amount and relative address width exceeds a range to branch with a branch instruction of the shortest code length, and selects branch instruction of a long code length when the sum is exceeded the range.

The address correcting means may correct locating address of the instruction included in the re-location information following the branch instruction and an address value of jumping destination label, depending upon variation of the code length of the branch instruction, and
  the segment correcting means may correct the segment size depending upon variation of code length of the branch instruction, at a timing terminating process with respect to all branch instruction included in the segment.

The instruction judging means may perform judgement of the branch instruction on the basis of a kind of instruction designated by the re-location information with respect to instruction included in the segment;
  the code variation amount calculating means may calculate a total of code variation amount included in the re-location information presenting between the branch instruction and the jumping destination label;
  the instruction determining means may determine modification of the code length of branch instruction on the basis of the total of the code variation amount and a relative address width,
  the address correction means may correct address value of locating address of the instruction and the jumping destination label included in the re-location information following the branch instruction depending upon variation of the code length of the branch instruction; and
  the segment correcting means may correct the segment size depending upon variation of the code length of the branch instruction at a timing terminating process with respect to all branch instructions included in the segment.

The instruction judgement means may perform judgement of branch instruction on the basis of a kind of instruction designated by the re-location information, the code variation amount calculating means may calculate a sum of code variation amount included in the re-location information presenting between the branch instruction and the jumping label, and the instruction determining means may make judgement whether a sum of a total of the code variation amount and relative address width exceeds a range to branch with a branch instruction of the shortest code length, and selects branch instruction of a long code length when the sum is exceeded the range, the address correction means may correct address value of locating address of the instruction and the jumping destination label included in the re-location information following the branch instruction depending upon variation of the code length of the branch instruction; and the segment correcting means may correct the segment size depending upon variation of the code length of the branch instruction at a timing terminating process with respect to all branch instructions included in the segment.

The optimization process may be related with respect to the branch instructions in the segment until the optimization process is terminated with respect to all of branch instructions designated by re-location information included in the segment and until the total of the code variation amount of all re-location information included in the segments becomes not vary, the segment correction means may correct the segment size depending upon variation of the code length of the branch instruction after termination of the optimization process with respect to all branch instruction and at a timing where the total of the code variation amount of all re-location information included in the segments becomes not vary.

The maximum variation amount of the code length of the branch instruction may be set as an initial value of the code variation amount in the re-location information;

the instruction determining means may subtracts the code variation amount in the extent increasing the code length of branch instruction;

the optimization process may be repeated with respect to the branch instruction in the segment until termination of the optimization process with respect to all of branch instruction designated in the re-location information included in the segment and until a total of code variation amount of all of re-location information included in the segment becomes "0"; and the segment correction means may correct the segment size depending upon variation of code length of the branch instruction after termination of the optimization process with respect to all branch instruction and at a timing where the total of the code variation amount of all re-location information included in the segments becomes "0".

According to another aspect of the invention, a branch instruction optimizing processing method for performing optimization of code length of branch instruction for branching between modules in locating modules by a linkage editor for an information processing system, comprises:

step of locating a plurality of segments forming object modules within address space according to preferential order of location; and step of performing optimization of branch instruction per segment on the basis of a re-location information describing code variation information per instruction to be processed via address included in the object module;

the optimization processing step including:
step of judgement of branch instruction contained in the segment;
step of calculating the code variation amount between the branch instruction and a jumping label;
step of calculating a relative address width between the address of the branch instruction and the jumping destination label;
step of modifying and determining the code length of branch instruction on the basis of the code variation amount and relative address width;
step of correcting address of instruction following the branch instruction and an address value of the jumping label depending upon variation of the code length of the determined branch instruction;
step of correcting the segment size depending upon variation of the code length of the branch instruction; and
the locating means re-locating all segments of the object module in the address space every time the optimization process of branch instruction with respect to one segment by the optimization process.

The instruction judgement step may perform judgement of branch instruction on the basis of a kind of instruction designated by the re-location information, the code variation amount calculating step may calculate a sum of code variation amount included in the re-location information presenting between the branch instruction and the jumping label, and the instruction determining step may determine modification of the code length of branch instruction on the basis of a sum of the code variation amount and the relative address width.

The instruction judging step may perform judgement of the branch instruction on the basis of a kind of instruction designated by the re-location information, the code variation amount calculating step may calculate a sum of code variation amount included in the re-location information presenting between the branch instruction and the jumping destination label, and the instruction determining step may determine modification of the code length of the branch instruction on the basis of total of the code variation amount and relative address width;

the address correcting step may correct locating address of the instruction included in the re-location information following the branch instruction and an address value of jumping destination label, depending upon variation of the code length of the branch instruction; and the segment correcting step may correct the segment size depending upon variation of code length of the branch instruction, at a timing terminating process with respect to all branch instruction included in the segment.

Alternatively, the instruction judgement step may perform judgement of branch instruction on the basis of a kind of instruction designated by the re-location information, the code variation amount calculating step may calculate a sum of code variation amount included in the re-location information presenting between the branch instruction and the jumping label, the instruction determining step may determine modification of the code length of branch instruction on the basis of a sum of the code variation amount and the relative address width, the address correcting step may correct locating address of the instruction included in the re-location information following the branch instruction and an address value of jumping destination label, depending upon variation of the code length of the branch instruction, and the segment correcting step may correct the segment size depending upon variation of code length of the branch instruction, at a timing terminating process with respect to all branch instruction included in the segment.

The maximum variation amount of the code length of the branch instruction may be set as an initial value of the code variation amount in the re-location information;

the instruction determining step may subtract the code variation amount in the extent increasing the code length of branch instruction;

the optimization process may be repeated with respect to the branch instruction in the segment until termination of the optimization process with respect to all of branch instruction designated in the re-location information included in the segment and until a total of code variation amount of all of re-location information included in the segment becomes "0"; and the segment correction step may correct the segment size depending upon variation of code length of the branch instruction after termination of the optimization process with respect to all branch instruction and at a timing where the total of the code variation amount of all re-location information included in the segments becomes "0".

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of a linkage editor according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
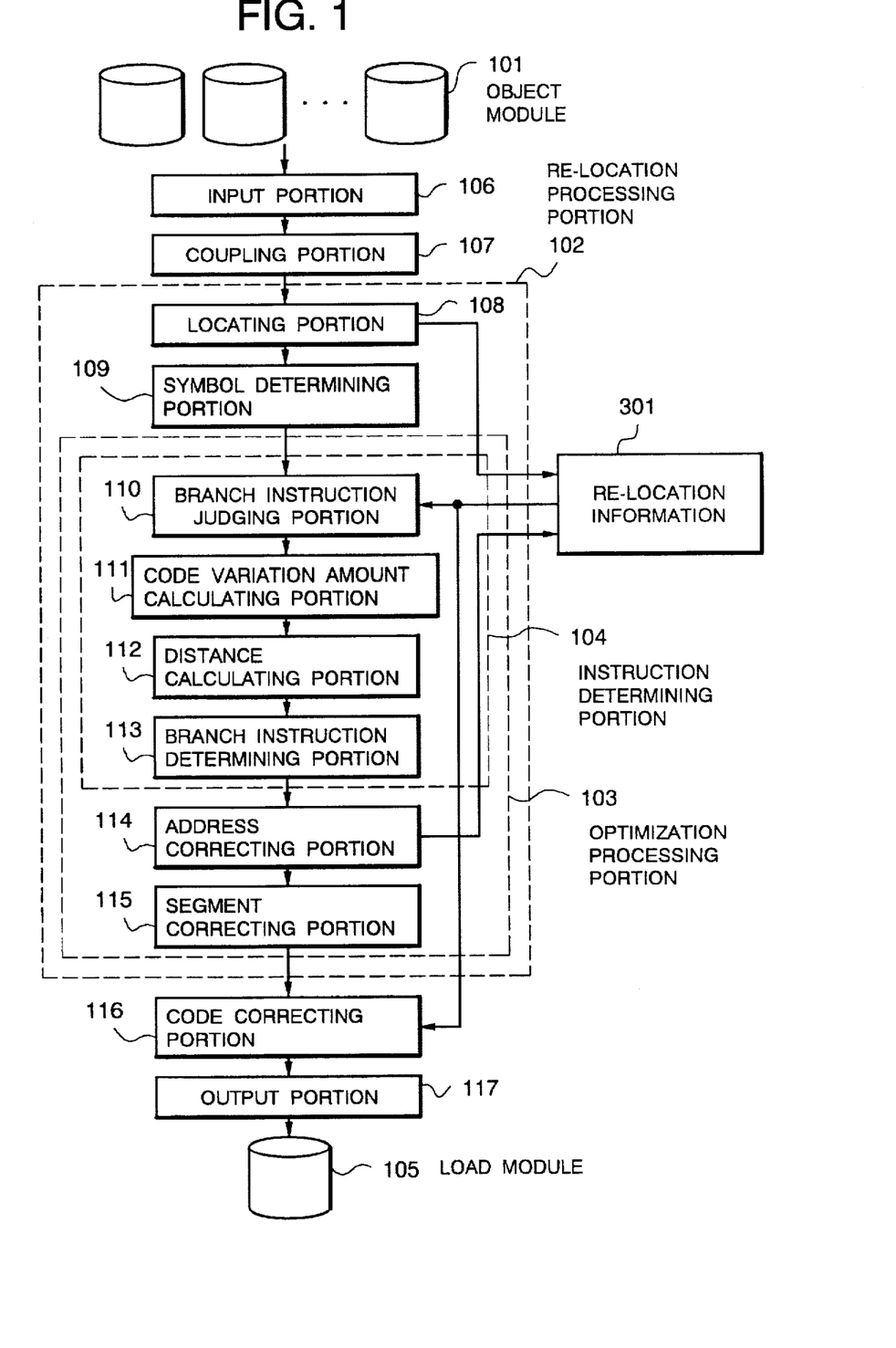
FIG. 1 is a block diagram showing a construction of a linker having one embodiment of a branch instruction processing system to which the present invention is applied.

FIG. 1 shows a construction of a linker having the preferred embodiment of a branch instruction processing system according to the present invention.

As shown in FIG. 1, the linker (linkage editor) having the preferred embodiment of the branch instruction processing system includes an input portion 106 inputting object modules output by a re-locatable assembler and compiler, a coupling portion 107 performing coupling of respective modules, locating portion 108 for locating the coupled modules in an address space per each segment, a symbol determining portion 108 for determining the address determined by the locating portion 108 by reflecting on an address value of a label (symbol), a code correcting portion 116 for correcting a re-locatable instruction code into an absolute value on the basis of the address value of the label determined by the symbol determining portion 109, a re-location information 301 containing correction information of correction for the code input by the input portion 106 and an output portion for outputting load modules.

The linker further includes an instruction determining portion 104 which comprises a branch instruction judging portion 110 for identifying branch instructions according to the re-location information 301 per segment as information for determining the branch instruction, a code variation amount calculating portion 111 for calculating a code variation amount of the branch instruction between the branch instruction and the label to which the branch instruction makes reference to, a distance calculating portion 112 for calculating a distance between the branch instruction and the label to which the branch instruction make reference to, a branch instruction determining portion 113 for determining the branch instruction. The linker also includes an address correcting portion 114 for making correction of each address and symbol value in the case where the code length of the branch instruction determined by the instruction determining portion 104, and a segment correcting portion 115 for making correction of the size of the segment after determining all of the branch instruction in the segments.

In this linker, these instruction determining portion 104, the address correcting portion 114 and the segment correcting portion 115 form an optimization processing portion 103. On the other hand, the locating portion 108, the symbol determining portion 109 and the optimization processing portion 103 for a re-location processing portion 102.

In the re-location processing portion 102, a result of process by the optimization processing portion 103.

In the re-location processing portion 102, as a result of process by the optimization processing portion 103, if the segment size is varied, feedback is caused in the re-location process as set out later for re-locating the segments including the segment, for which the locating portion 108 completes current process. The symbol determining portion 109 reflects the address determined by location on the address value of the label to control to the subsequent optimization process of segment. Accordingly, instead of performing re-location only once as in the prior art, re-location process is repeated per every segments to optimize the branch instructions in the segments.

Next, operation of the shown embodiment will be discussed. At first, information necessary for coupling a plurality of files from an object module 101 is input to the input portion 106 to perform coupling process of respective modules by a coupling portion 107.

Next, the locating portion 108 locates the coupled module in the address space per segments. In the symbol determining portion 109, the address value of the label is determined on the basis of the address determined by location. In the code correcting portion 116, by the re-location information 301 having correction information for correction of the code input by the input portion 106, correction is performed with respect to the address value of the label determined by the symbol determining portion 109 with respect to the portion which is not determined the object code. In the output portion 117, the load module determined as set forth above is output.

The code correcting portion 116 performs code correction after termination of the optimization processing portion 103 and the re-location processing portion 102 and completion of location and symbol determination of all segments.

Figure 2:
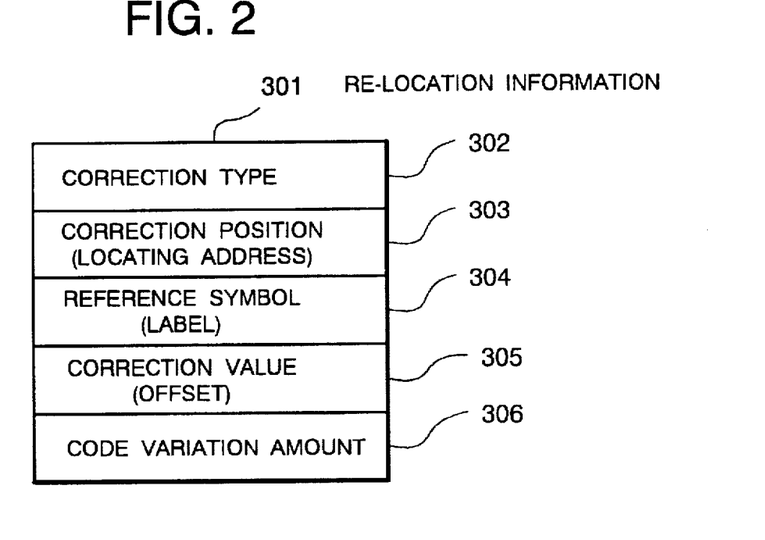
FIG. 2 is an illustration showing a structure of a re-location information relating to one embodiment of the branch instruction processing system of FIG. 1.

As shown in FIG. 2, the re-location information 301 includes a correction type 302, a correcting position 303, a reference symbol (label) 304, a correcting value 305 and code variation amount 306.

Here, in the correction type 302, a kind of instruction to perform process via the address is designated. In the correcting portion 303, an address, in which the instruction is described is designated. In the reference label, the jump destination label is designated. In correcting value 305, offset information in the segment is designated. Also, in the code variation amount 306, maximum variation amount of the code length variable in the initial condition is set. For example, when branch instruction of 2 byte code and branch instruction of 4 byte code are present as kinds of branch instructions, the code length is varied from 2 byte to 4 byte and from 4 byte to 2 byte, and the maximum variation amount is set to "2".

The optimization processing portion 103 performs the following process. At first, by the branch instruction judgement portion 110 of the instruction determining portion 104, judgement is made whether the correction type 302 of the re-location information 301 is the branch instruction or not. If the correction type of the re-location information is the branch instruction, a sum of the address of the branch instruction and code variation amount to the jumping destination (label) is calculated by the code variation amount calculating portion 111.

In the distance calculating portion 112, a distance (relative address width) between the branch instruction and the jumping destination label of the branch instruction is calculated on the basis of the reference symbol 304 and the correction value 305 of the re-location information 301, per segment.

Here, on the basis of calculated distance and the sum of the code variation amount, the branch instruction determining portion 123 makes judgement whether branching with the branch instruction of the short code length is possible or not in consideration of variation of the code length between the branch instruction and jumping destination. If branching with the short code length branch instruction is not possible, the correction type 302 is modified to the type of the branch instruction of long code length and subtracted the code length in the extent extended by replacing the code variation amount 306 with the code length of the branch instruction of long code length.

For example, when the code variation amount 306 of the re-location information is "2", when the branch instruction of 2 byte length is modified into the branch instruction of 3 byte length, since the code length is increased for 1 byte. Therefore, "1" is subtracted from the code variation amount to set the code variation amount to "1".

On the other hand, when the branch instruction cannot be the branch instruction of long code length in the light of the sum of the code variation amount, the code variation amount is set to "0".

In the address correcting portion, when the branch instruction is varied into the branch instruction of the long code length in the instruction determining portion, the correcting position 303 of the re-location information 301 following the branch instruction, for which the current process in the segment is completed, and the address value of the label in the extent corresponding to the length of the varied code length.

The segment correcting portion 115 performs correction for the segment size in the extent corresponding to the length of the varied code length after completion of the optimization process with respect to the segment currently in process.

Then, by returning to the locating portion 108, again optimization process is performed for the next segment. Namely, the locating portion 108 re-locate all of the segments following the currently processed element. Then, determined address is reflected in the address value of the label.

Figure 3:
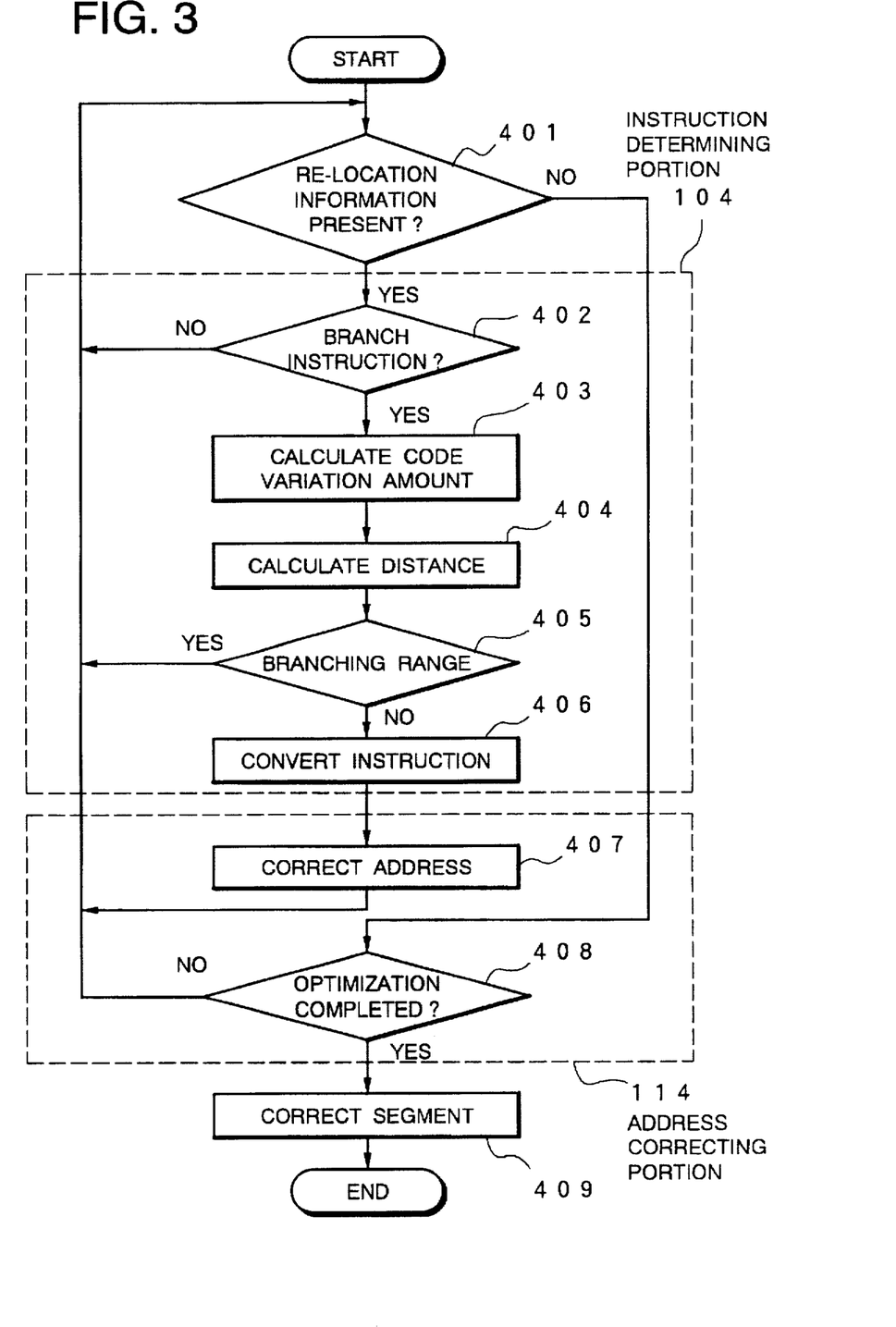
FIG. 3 is a flowchart showing a process procedure shoeing processing of the optimizing portion in one embodiment of the branch instruction processing system of FIG. 1.
Figure 4:
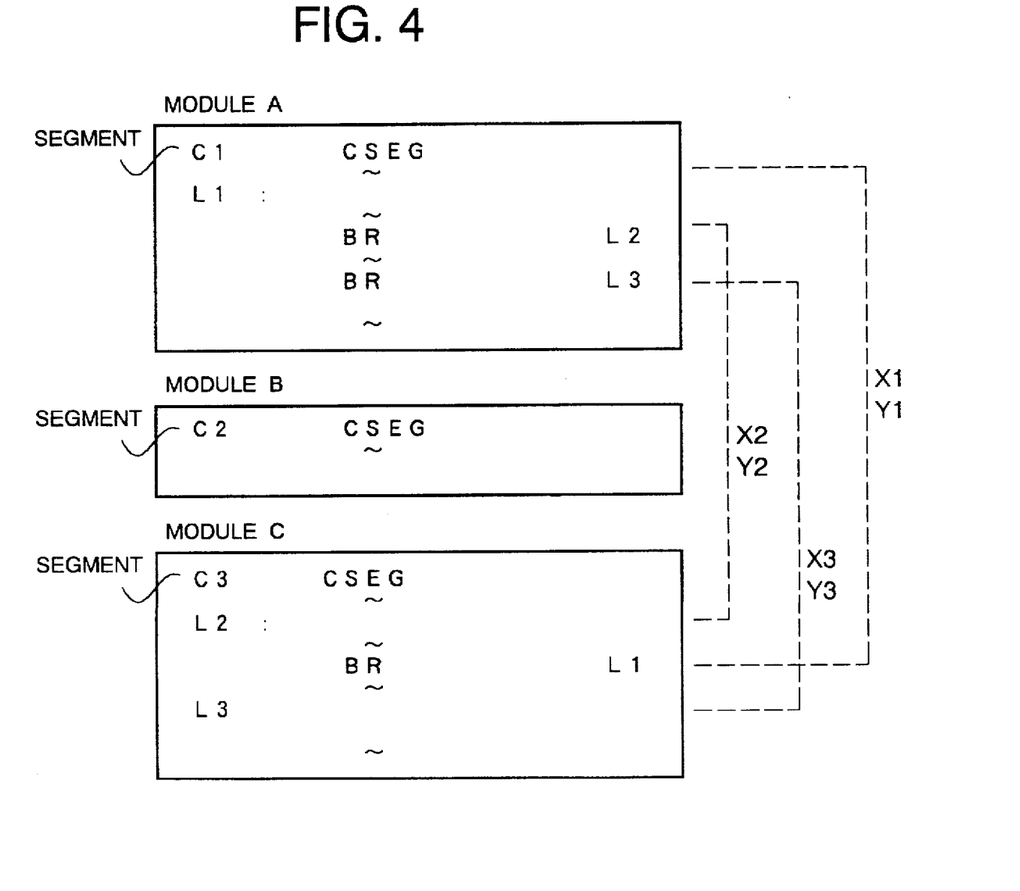
FIG. 4 is an explanatory illustration for explaining one example of the optimization processing portion in one embodiment of the branch instruction processing system of FIG. 1.

Hereinafter, the optimization process will be discussed with reference to the flowchart of FIG. 3.

Here, it is assumed that as the object modules 101, the modules A, B, C are input to the input portion. In the module A, a plurality of segments including a segment C1 is included. In the module B, a plurality of segments including a segment C2. In the module C, plurality of segments including a segment C3.

Figure 5:
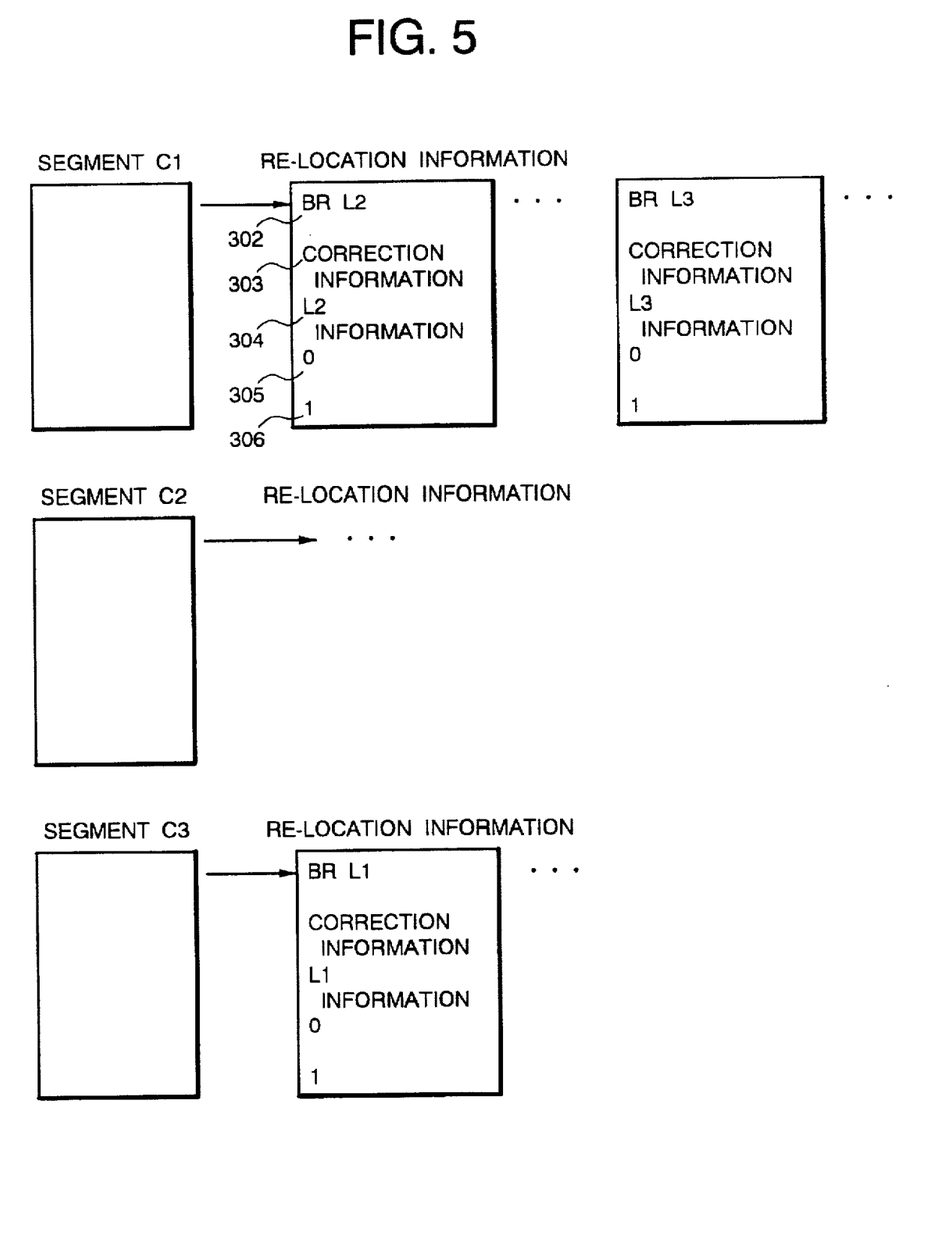
FIG. 5 is an explanatory illustration showing one example of re-location information relating to one embodiment of the branch instruction processing system of FIG. 1.

In this case, the order of preferential order of locating the segment is assumed as C1, C2, C3. On the other hand, the object module 101 is assumed to use all of branch instruction of the 2 byte codes as branch instructions between modules. The range to branch with the 2 byte code length branch instruction is within the relative distance from −128 to 127 bytes. Then, separately from the branch instruction of the 2 byte code length, consideration is given for the case where branching with the branch instruction of the 3 byte code which can branch within the range of the relative distance of 64 Kbyte. Also, the content of the segments C1, C2, C3 included in the re-location information 301 is as shown in FIG. 5.

In the optimization processing portion 103, at first, on the basis of the re-location information 301, judgement is made for presence or absence of the first segment C1 (step 401). Here, since the re-location information 301 of the branch instruction BR L2, is present, judgement is made that the re-location information 301 is present. Then, in the re-location information 301 of the branch instruction BR L2, "1" is preliminarily set as the code variation amount.

Next, in the instruction determining portion 104, judgement is made whether the instruction indicated by the re-location information is the branch instruction or not (step 402). Here, since the correction type 302 of the re-location information is branch instruction, a sum Y2 of the code variation amount between the branch instruction BR L2 and the jumping label L2 is calculated (step 403). The sum Y2 of the code variation amount is derived by summing the core variation amount 306 of the re-location information 301 presenting between the branch instruction BR L2 and the jumping destination label L2.

Furthermore, by calculating relative distance X2 between the next address and the label L2 (step 404), judgement is made whether the sum of the relative distance X2+sum of the code variation amount Y2 is within a range, in which branching with the branch instruction of the short code length (step 405). The reason why both of X2+Y2 (relative distance+sum of code variation amounts) and X2 is that the jumping destination of the branch instruction may be in reverse direction (direction to reduce the address). When X2+Y2 and X2 exceeds the range to be branched with the branch instruction of short code length, the correction type 302 of the re-location information 301 is converted into the type of the branch instruction of the 3 byte code length as the long code length branch instruction (step 406). Then, the code variation amount of the re-location information of the branch instruction BR L2 is set to "0".

In the address correcting portion 14, since the branch instruction is modified to be the branch instruction of 3 byte code length, the corrected position information 303 of the re-location information 301 and the address value of the label are corrected for 1 byte corresponding to the varied code length (step 407). Then, the process is returned to step 401 to check presence or absence of the next re-location information 301 to repeat the process.

At step 405, if X2+Y2 (relative distance+sum of code variation amounts) and X2 is within the range to branch with the branch instruction of short code length, modification of the branch instruction is not performed and process is returned to repeat the process.

At step 401, when no-re-location information 301 is present in the segment, check is performed whether the core variation amount 206 of all of the re-location information 301 in the segment C1 become "0" or whether variation amount becomes zero (if the address correction become zero) to make judgement of termination of the optimization process (step 408).

When judgement is made that the optimization for the segment C1 is completed, correction of segment is performed in the segment correcting portion (step 409). In segment correction, when the branch instructions BR L2 and BR L3 are varied into 3 byte code length branch instruction, the segment size of the segment C1 is corrected for 2 bytes.

Then, returning to the locating portion 108, the segments C2 and C3 as well as the segment C1 are re-located within the address space. Then, the addresses determined by re-location is reflected in the address values of the labels by the symbol determining portion 109. Subsequently, optimization process is performed for the segment C2 as the next segment.

When the optimization process of the segment C2 is completed, returning to the locating portion 108, the segments C2 and C3 as well as the segment C1 are relocated within the address space. Then, the addresses determined by re-location is reflected in the address values of the labels by the symbol determining portion 109. Subsequently, optimization process is performed for the segment C3 as the next segment.

Thus, in the shown embodiment, the branch instructions are determined in consideration of the code length in the optimization processing portion 103 and re-location is repeated at every time of optimization. Thus, it becomes possible to optimize the branch instructions between modules.

It the present invention, the code length of respective branch instructions can be optimized by calculating the code variation amount between the branch instruction and the label to which the branch instruction make reference to for determining the branch instruction, performing address correction and segment correction, for example, and repeating re-location every time of determination of the branch instruction according to the preferential order of location of the segment to optimize branch instructions between all of the modules in the program.

According to the present invention, the branch instructions between all of the modules in the program can be optimized. In particular, when the locating order of the segment is not ascending order or a large number of branch instructions are present between the branch instruction and the label to which the branch instruction makes reference to, the code length of all branch instruction can be optimized.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A branch instruction optimizing process system for performing optimization of code length of branch instruction for branching between modules in locating modules by a linkage editor for an information processing system, comprising:

locating means for locating a plurality of segments forming object modules within address space according to preferential order of location; and optimization processing means for performing optimization of branch instruction per segment on the basis of a re-location information describing code variation information per instruction to be processed via address included in said object module;

said optimization processing means including:

instruction judging means for making judgement of branch instruction contained in said segment;

code variation amount calculating means for calculating the code variation amount between said branch instruction and a jumping label;

distance calculating means for calculating a relative address width between the address of said branch instruction and said jumping destination label;

instruction determining means for modifying and determining the code length of branch instruction on the basis of said code variation amount and relative address width;

address correction means for correcting address of instruction following said branch instruction and an address value of said jumping label depending upon variation of the code length of the determined branch instruction;

segment correction means for correcting said segment size depending upon variation of the code length of said branch instruction; and said locating means re-locating all segments of said object module in said address space every time the optimization process of branch instruction with respect to one segment by said optimization means.

2. A branch instruction optimization processing system as set forth in claim 1, wherein said instruction judgement means performs judgement of branch instruction on the basis of a kind of instruction designated by said re-location information, said code variation amount calculating means calculates a sum of code variation amount included in said re-location information presenting between said branch instruction and the jumping label, and said instruction determining means determines modification of the code length of branch instruction on the basis of a sum of said code variation amount and the relative address width.

3. A branch instruction optimization process system as set forth in claim 1, wherein said instruction judging means performs judgement of the branch instruction on the basis of a kind of instruction designated by said re-location information, said code variation amount calculating means calculates a sum of code variation amount included in said re-location information presenting between said branch instruction and the jumping destination label, and said instruction determining means makes judgement whether a sum of a total of said code variation amount and relative address width exceeds a range to branch with a branch instruction of the shortest code length, and selects branch instruction of a long code length when the sum is exceeded the range.

4. A branch instruction optimization process system as set forth in claim 1, wherein said address correcting means corrects locating address of said instruction included in said re-location information following the branch instruction and an address value of jumping destination label, depending upon variation of the code length of said branch instruction; and said segment correcting means corrects said segment size depending upon variation of code length of said branch instruction, at a timing terminating process with respect to all branch instruction included in said segment.

5. A branch instruction optimization process system as set forth in claim 1, wherein said instruction judging means performs judgement of the branch instruction on the basis of a kind of instruction designated by said re-location information with respect to instruction included in said segment;

said code variation amount calculating means calculates a total of code variation amount included in said re-location information presenting between said branch instruction and the jumping destination label;

said instruction determining means determines modification of the code length of branch instruction on the basis of the total of said code variation amount and a relative address width, said address correction means corrects address value of locating address of said instruction and the jumping destination label included in said re-location information following the branch instruction depending upon variation of the code length of said branch instruction; and said segment correcting means corrects said segment size depending upon variation of the code length of said branch instruction at a timing terminating process with respect to all branch instructions included in said segment.

6. A branch instruction optimization process system as set forth in claim 1, wherein said instruction judgement means performs judgement of branch instruction on the basis of a kind of instruction designated by said re-location information, said code variation amount calculating means calculates a sum of code variation amount included in said re-location information presenting between said branch instruction and the jumping label, and said instruction determining means makes judgement whether a sum of a total of said code variation amount and relative address width exceeds a range to branch with a branch instruction of the shortest code length, and selects branch instruction of a long code length when the sum is exceeded the range, said address correction means corrects address value of locating address of said instruction and the jumping destination label included in said re-location information following the branch instruction depending upon variation of the code length of said branch instruction; and said segment correcting means corrects said segment size depending upon variation of the code length of said branch instruction at a timing terminating process with respect to all branch instructions included in said segment.

7. A branch instruction optimization process system as set forth in claim 1, wherein said optimization process is related with respect to the branch instructions in said segment until the optimization process is terminated with respect to all of branch instructions designated by re-location information included in said segment and until the total of the code variation amount of all re-location information included in said segments becomes not vary.

said segment correction means corrects said segment size depending upon variation of the code length of said branch instruction after termination of said optimization process with respect to all branch instruction and at a timing where the total of the code variation amount of all re-location information included in said segments becomes not vary.

8. A branch instruction optimization process system as set forth in claim 1, wherein the maximum variation amount of the code length of said branch instruction is set as an initial value of the code variation amount in said re-location information;

said instruction determining means subtracts said code variation amount in the extent increasing the code length of branch instruction;

the optimization process is repeated with respect to the branch instruction in said segment until termination of the optimization process with respect to all of branch instruction designated in said re-location information included in said segment and until a total of code variation amount of all of re-location information included in said segment becomes "0"; and said segment correction means corrects said segment size depending upon variation of code length of said branch instruction after termination of said optimization process with respect to all branch instruction and at a timing where the total of the code variation amount of all re-location information included in said segments becomes "0".

9. A branch instruction optimizing processing method for performing optimization of code length of branch instruction for branching between modules in locating modules by a linkage editor for an information processing system, comprising:

step of locating a plurality of segments forming object modules within address space according to preferential order of location; and step of performing optimization of branch instruction per segment on the basis of a re-location information describing code variation information per instruction to be processed via address included in said object module;

said optimization processing step including:

step of judgement of branch instruction contained in said segment;

step of calculating the code variation amount between said branch instruction and a jumping label;

step of calculating a relative address width between the address of said branch instruction and said jumping destination label;

a step of modifying and determining the code length of branch instruction on the basis of said code variation amount and relative address width;

step of correcting address of instruction following said branch instruction and an address value of said jumping label depending upon variation of the code length of the determined branch instruction;

step of correcting said segment size depending upon variation of the code length of said branch instruction; and said locating means re-locating all segments of said object module in said address space every time the optimization process of branch instruction with respect to one segment by said optimization process.

10. A branch instruction optimization processing method as set forth in claim 9, wherein said instruction judgement step performs judgement of branch instruction on the basis of a kind of instruction designated by said re-location information, said code variation amount calculating step calculates a sum of code variation amount included in said re-location information presenting between said branch instruction and the jumping label, and said instruction determining step determines modification of the code length of branch instruction on the basis of a sum of said code variation amount and the relative address width.

11. A branch instruction optimization processing method as set forth in claim 9, wherein said instruction judging step performs judgement of the branch instruction on the basis of a kind of instruction designated by said re-location information, said code variation amount calculating step calculates a sum of code variation amount included in said re-location information presenting between said branch instruction and the jumping destination label, and said instruction determining step determines modification of the code length of the branch instruction on the basis of total of said code variation amount and relative address width;

said address correcting step corrects locating address of said instruction included in said re-location information following the branch instruction and an address value of jumping destination label, depending upon variation of the code length of said branch instruction; and said segment correcting step corrects said segment size depending upon variation of code length of said branch instruction, at a timing terminating process with respect to all branch instruction included in said segment.

12. A branch instruction optimization process system as set forth in claim 9, wherein said instruction judgement step performs judgement of branch instruction on the basis of a kind of instruction designated by said re-location information, said code variation amount calculating step calculates a sum of code variation amount included in said re-location information presenting between said branch instruction and the jumping label, said instruction determining step determines modification of the code length of branch instruction on the basis of a sum of said code variation amount and the relative address width, said address correcting step corrects locating address of said instruction included in said re-location information following the branch instruction and an address value of jumping destination label, depending upon variation of the code length of said branch instruction, and said segment correcting step corrects said segment size depending upon variation of code length of said branch instruction, at a timing terminating process with respect to all branch instruction included in said segment.

13. A branch instruction optimization process method as set forth in claim 9, wherein the maximum variation amount of the code length of said branch instruction is set as an initial value of the code variation amount in said re-location information;

said instruction determining step subtracts said code variation amount in the extent increasing the code length of branch instruction;

the optimization process is repeated with respect to the branch instruction in said segment until termination of the optimization process with respect to all of branch instruction designated in said re-location information included in said segment and until a total of code variation amount of all of re-location information included in said segment becomes "0"; and said segment correction step corrects said segment size depending upon variation of code length of said branch instruction after termination of said optimization process with respect to all branch instruction and at a timing where the total of the code variation amount of all re-location information included in said segments becomes "0".

* * * * *